US009126588B2

(12) United States Patent
Hessell et al.

(10) Patent No.: US 9,126,588 B2
(45) Date of Patent: Sep. 8, 2015

(54) METHOD AND APPARATUS FOR CONTROLLING A POWERTRAIN SYSTEM INCLUDING A MULTI-MODE TRANSMISSION

(75) Inventors: Steven M. Hessell, Clarkston, MI (US); Robert L. Morris, Milford, MI (US); Sean W. McGrogan, Ann Arbor, MI (US); Anthony H. Heap, Ann Arbor, MI (US); Gil J. Mendoza, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 25 days.

(21) Appl. No.: 13/495,037

(22) Filed: Jun. 13, 2012

(65) Prior Publication Data
US 2013/0338861 A1   Dec. 19, 2013

(51) Int. Cl.
*B60K 6/442*  (2007.10)
*B60W 10/06*  (2006.01)
*B60W 10/08*  (2006.01)
*B60W 20/00*  (2006.01)
*B60K 6/445*  (2007.10)

(52) U.S. Cl.
CPC ............... *B60W 20/20* (2013.01); *B60K 6/445* (2013.01); *B60W 10/06* (2013.01); *B60W 10/08* (2013.01); *B60W 2710/0644* (2013.01); *B60W 2710/0666* (2013.01); *Y02T 10/6239* (2013.01); *Y02T 10/6286* (2013.01)

(58) Field of Classification Search
CPC .................. B60W 2710/0666; Y02T 10/6286; Y02T 10/6239
USPC .............. 701/60, 62, 93, 95, 99; 60/276, 277, 60/286; 477/125
See application file for complete search history.

(56) References Cited

U.S. PATENT DOCUMENTS 7,645,206 B2    1/2010  Holmes et al.
2009/0118081 A1*  5/2009  Heap et al. .................... 477/3

OTHER PUBLICATIONS

U.S. Appl. No. 13/444,773, Tan et al.

* cited by examiner

*Primary Examiner* — Redhwan K Mawari
*Assistant Examiner* — Rodney P King

(57) ABSTRACT

A powertrain including an engine and torque machines is configured to transfer torque through a multi-mode transmission to an output member. A method for controlling the powertrain includes employing a closed-loop speed control system to control torque commands for the torque machines in response to a desired input speed. Upon approaching a power limit of a power storage device transferring power to the torque machines, power limited torque commands are determined for the torque machines in response to the power limit and the closed-loop speed control system is employed to determine an engine torque command in response to the desired input speed and the power limited torque commands for the torque machines.

14 Claims, 4 Drawing Sheets

METHOD AND APPARATUS FOR CONTROLLING A POWERTRAIN SYSTEM INCLUDING A MULTI-MODE TRANSMISSION

GOVERNMENT CONTRACT RIGHTS

This invention was made with U.S. Government support under Agreement No. DE-FC26-08NT04386 awarded by the U.S. Department of Energy. The U.S. Government may have certain rights in this invention.

TECHNICAL FIELD

This disclosure is related to powertrain systems employing multi-mode transmissions.

BACKGROUND

The statements in this section merely provide background information related to the present disclosure. Accordingly, such statements are not intended to constitute an admission of prior art.

Powertrain systems include multi-mode transmissions to combine and transfer torque from torque actuators to a drivetrain to provide tractive force for a vehicle. Torque actuators may include internal combustion engines and non-combustion machines including, e.g., electric motors, hydraulic motors, and mechanical motors. Non-combustion machines may be controlled to generate torque or convert mechanical torque to storable energy. For example, an electric motor may generate electricity that is immediately used in another electric motor or is remotely stored in a battery or high-voltage capacitor. It is known to employ one of the motors primarily for generating torque and another of the motors primarily for generating electricity. However, the multi-mode transmission may be configured to employ the motors to simultaneously generate torque or simultaneously generate electricity. Thus, during ongoing operation, the motors may operate in torque-generative mode to maximize tractive force when torque demands are high.

Multi-mode transmissions may utilize differential gear set(s) and clutch(es) to manage torque between the torque actuators and the drivetrain. Through clutch activations, the multi-mode transmission may operate in neutral, fixed gear modes and variable ratio modes.

SUMMARY

A powertrain including an engine and torque machines is configured to transfer torque through a multi-mode transmission to an output member. A method for controlling the powertrain includes employing a closed-loop speed control system to control torque commands for the torque machines in response to a desired input speed. Upon approaching a power limit of a power storage device transferring power to the torque machines, power limited torque commands are determined for the torque machines in response to the power limit and the closed-loop speed control system is employed to determine an engine torque command in response to the desired input speed and the power limited torque commands for the torque machines.

BRIEF DESCRIPTION OF THE DRAWINGS

One or more embodiments will now be described, by way of example, with reference to the accompanying drawings, in which.

DETAILED DESCRIPTION

Figure 1:
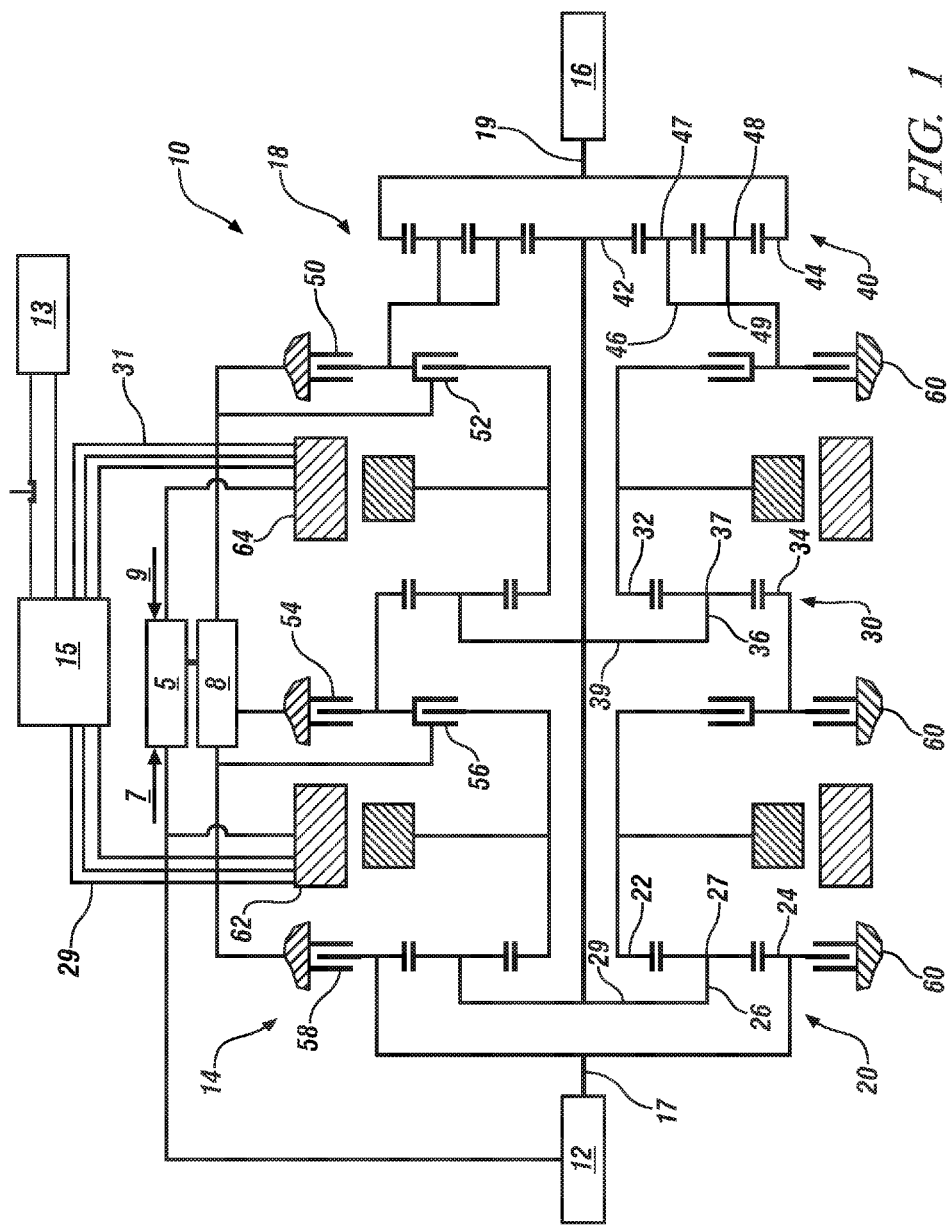
FIG. 1 illustrates a powertrain system configured to provide tractive force for a vehicle, in accordance with the present disclosure.

Referring now to the drawings, wherein the showings are for the purpose of illustrating certain exemplary embodiments only and not for the purpose of limiting the same, FIG. 1 schematically illustrates a powertrain system 10 configured to provide tractive force to propel a vehicle. The powertrain system 10 includes a multi-mode transmission 14 configured to interconnect an engine 12, a first torque machine 62, a second torque machine 64 and an output member 19 that is configured to transfer torque to a driveline 16. Like numerals refer to like elements throughout the description. The powertrain system 10 may be configured to operate as any one of an electric-hybrid system, an extended-range electric vehicle system (EREV), or another configuration.

The engine 12 is preferably a multi-cylinder direct fuel injection internal combustion engine that converts fuel to mechanical power through a combustion process. The engine 12 is equipped with a plurality of sensing devices and actuators configured to monitor operation and deliver fuel to form a combustion charge to generate torque. The engine 12 is configured to execute autostart and autostop control schemes and fuel cutoff (FCO) control schemes during ongoing operation of the powertrain system 10. The engine 12 is considered to be in an ON state when it is being fueled and is firing. The engine 12 is considered to be in an OFF state when it is not being fueled and is not spinning. The engine 12 is considered to be in an FCO state when it is not being fueled but is spinning.

The first and second torque machines 62 and 64, respectively, preferably include multi-phase electric motor/generators electrically connected to an inverter module 15. The first and second motors 62 and 64, respectively, are configured to operate in torque-generative modes to convert stored electric energy to mechanical power and in electric power generating modes to convert mechanical power to electric energy storable in an energy storage device 13, e.g., a high-voltage battery. The first and second torque machines 62 and 64 have limitations in power outputs in the form of torque and rotational speeds, including torque limitations associated with battery power limits from the energy storage device 13.

The multi-mode transmission 14 includes an input member 17 continuously coupled with the engine 12, a planetary gear arrangement 18, and the output member 19 continuously coupled with the driveline 16. A torque converter may be positioned between the engine 12 and the input member 17. When no torque converter is present, a vibration isolator may be positioned between the engine 12 and the input member 17. The exemplary planetary gear arrangement 18 includes three planetary gear sets including a first planetary gear set 20, a second planetary gear set 30, and a third planetary gear set 40. The first planetary gear set 20 includes a sun gear member 22, a ring gear member 24, and a planet carrier assembly member 26. The planet carrier assembly member 26 includes a plurality of pinion gears 27 rotatably mounted on a carrier member 29 that interact with both the sun gear member 22 and the ring gear member 24. The second planetary gear set 30 includes a sun gear member 32, a ring gear member 34, and a planet carrier assembly member 36. The planet carrier assembly member 36 includes a plurality of pinion gears 37 rotatably mounted on a carrier member 39 that interact with both the sun gear member 32 and the ring member 34. The third planetary gear set 40 includes a sun gear member 42, a ring gear member 44, and a planet carrier assembly member 46. The planet carrier assembly member 46 includes a plurality of pinion gears 47, 48 rotatably mounted on a carrier member 49. The pinion gears 47 interact with the sun gear member 42 and the pinion gears 48. The pinion gears 48 interact with the ring gear member 44 and the pinion gears 47. The third planetary gear set 40 is a compound planetary gear set.

The first and second torque machines 62 and 64 are integrated with the multi-mode transmission 14. The first torque machine 62 is coupled to the transmission 14 at the sun gear member 22 and selectively coupled to ring member 34 as explained below. The second torque machine 64 is coupled to the transmission 14 at the sun gear member 32 and selectively coupled to the planet carrier assembly member 46 as explained below. The first and second torque machines 62, 64 transfer torque to the transmission 14 independently or in combination with each other and the engine 12.

The illustrated planetary gear arrangement 18 includes five selectable torque transmitting clutches C1 50, C2 52, C3 54, C4 56, and C5 58. The torque transmitting clutches C2 52 and C4 56 are any suitable rotating-type torque transfer mechanisms, and are commonly multi-plate clutch devices arranged in a friction configuration. The torque transmitting clutches C1 50, C3 54 and C5 58 are brake or reaction clutches, and may include any suitable stationary-type torque transmitting mechanisms, including by way of example selectable one-way clutches (SOWC), selectable roller clutches, selectable sprag clutches, or other devices without limitation.

The input member 17 is continuously coupled to the ring gear member 24 and the output member 19 is continuously coupled to the ring carrier member 29. The ring gear member 22 is selectively connectable to the carrier member 29 through activation of the clutch C5 58. The first torque machine 62 is selectively connectable to the ring gear member 34 through activation of the clutch C4 56. The ring gear member 34 is selectively connectable to the transmission housing 60 through activation of the clutch C3 54. The second torque machine 64 is selectively connectable to the planet carrier assembly member 46 through activation of the clutch C2 52. The planet carrier assembly member 36 is selectively connectable to the transmission housing 60 through activation of the clutch C1 50.

The transmission 14 includes a hydraulic fluid circuit 8 that includes a plurality of fluid circuits for routing fluid to appropriate areas of the transmission 14. The fluid circuits supply hydraulic pressure to apply individual ones of the clutches C1 50, C2 52, C3 54, C4 56, and C5 58. The hydraulic fluid circuit 8 is signally connected to a control module 5 to selectively open and close valves to provide fluid flow into the desired fluid circuit(s) to activate and deactivate the individual clutches C1 50, C2 52, C3 54, C4 56, and C5 58.

The control module 5 operatively connects to the hydraulic circuit 8 to activate and deactivate the clutches C1 50, C2 52, C3 54, C4 56, and C5 58. The control module 5 signally and operatively connects to each of the engine 12, the first torque machine 62, and the second torque machine 64. The control module 5 monitors an output torque request 7 and powertrain operating parameters 9, e.g., current engine torque output, wheel speed sensor output, and gear selection to select appropriate motor output and clutches C1 50, C2 52, C3 54, C4 56, and C5 58 to achieve a selected gear ratio for operation. The selected gear ratio may be selected from a series of look-up tables or computed based on the operator torque request 7 and the powertrain operating parameters 9. The selected gear ratio may be a fixed gear ratio, a continuously variable mode, or a neutral state.

The powertrain 10 is configured to operate in one of a plurality of powertrain states, including a plurality of ranges of the transmission 14 and engine states of on and off. When the engine is in the off state, it is unfueled, not firing, and is not spinning. When the engine is in the on state it is fueled, firing, and spinning. The transmission 14 is configured to operate in one of a plurality of neutral (Neutral), fixed gear (Gear #), variable mode (EVT Mode #), electric vehicle (EV#) and transitional (EV Transitional State #), pseudoGear #) states through selective activation of the clutches C1 50, C2 52, C3 54, C4 56, and C5 58. Table 1 depicts a plurality of powertrain states including transmission states and engine states for an embodiment of the powertrain 10.

TABLE 1

| Steady State Range | Engine State | C1 | C2 | C3 | C4 | C5 |
|---|---|---|---|---|---|---|
| Neutral | on/off | | | | | |
| Neutral | on/off | | x | | | |
| Neutral | on/off | | | x | | |
| pseudoGear 1 | on/off | x | | | | |
| pseudoGear 2 | on/off | | x | | | |
| Neutral | off | | | | | x |
| EVT Mode 1 | on/off | x | | x | | |
| EVT Mode 2 | on/off | x | | | x | |
| EVT Mode 3 | on/off | | x | | x | |
| EVT Mode 4 | on/off | | | x | x | |
| EVT Transitional State 1 | off | x | | | | x |
| EVT Transitional State 2 | off | | x | | | x |
| Gear 1 | on | x | | x | x | |
| Gear 2 | on | x | x | | x | |
| Gear 3 | on | | x | x | x | |
| EV1 (Electric Vehicle 1) | off | x | | x | | x |
| EV2 (Electric Vehicle 2) | off | x | | | x | x |
| EV3 (Electric Vehicle 3) | off | | x | | x | x |
| EV4 (Electric Vehicle 4) | off | | x | x | | x |
| EV Transitional State 3 | off | x | x | | | x |
| Neutral | on/off | | | x | x | |
| pseudoGear 3 | on/off | x | x | | | |
| Neutral | off | | | x | | x |
| Neutral | off | | | | x | x |

The control module 5 monitors the output torque request 7 and powertrain operating parameters 9 to calculate preferred torque commands required from the engine 12, first torque machine 62, and second torque machine 64 in conjunction with a preferred gear selection to control operation of the powertrain system 10 to generate tractive torque in response to the output torque request 7. For example, the control module 5 may select operation in an EV mode wherein the first and second torque machines 62, 64 operate in torque-generative modes to provide torque output with the engine 12 in the OFF state. The control module 5 may select operation in a combustion mode wherein only the engine 12 generates tractive torque and the first and second torque machines 62, 64 operate in electric power generating modes. The control module 5 may select operation in a combination mode wherein the engine 12 and one or both the first and second torque machines 62, 64 operates in the torque-generative mode.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

Figure 2:
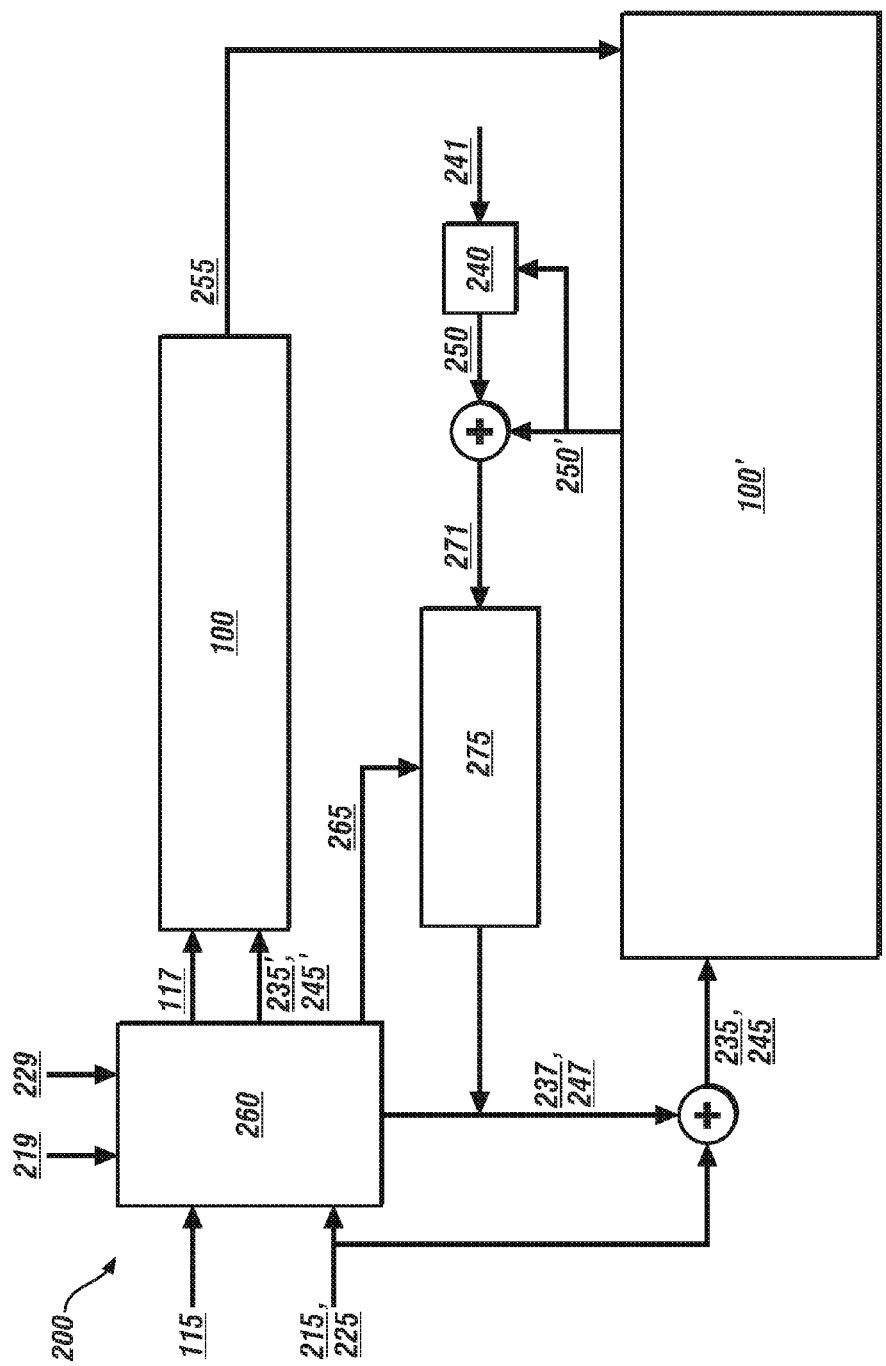
FIGS. 2 and 3 illustrate a closed-loop speed control system configured to control operation of a multi-mode transmission, in accordance with the disclosure.

FIG. 2 schematically shows an embodiment of a closed-loop speed control system 200 that is configured to control operation of a powertrain system 100 employing a multi-mode transmission. One embodiment of the powertrain system 100 is the powertrain system 10 described with reference to FIG. 1. The closed-loop speed control system 200 employs a powertrain system estimator 100', a constraints scheme 260, and a feedback controller 275 to control operation of elements of the powertrain system 100 in response to an output torque request. Inputs to the closed-loop speed control system 200 include open-loop motor torque commands Ta_ol 215 and Tb_ol 225 and an open-loop engine torque command Te_ol 115, which are determined in response to an output torque request.

The estimator 100' employs known schemes to estimate various transmission output states 250' based upon first and second final motor torque commands Ta 235 and Tb 245, respectively, and a monitored state vector that includes a plurality of powertrain output states 255. The powertrain output states 255 preferably include select transmission speed states, including by way of example, the input speed Ni, output speed No or wheel speed Nw, and first and second motor speeds Na and Nb. The output states 255 may also include select transmission torque states, including by way of example, a damper torque and an axle torque. The estimator 100' monitors the control vector including the first and second final motor torque commands Ta 235 and Tb 245 and the output states 255.

The estimated output states 250' and a plurality of speed profiles 241 are input to a state reference scheme 240 to calculate or otherwise determine a plurality of reference states 250. The speed profiles 241 include projected speeds of powertrain elements, e.g., engine speed, output speed, and clutch speeds. The reference states 250 are arithmetically compared to corresponding ones of the estimated output states 250' to determine a plurality of control errors 271. The feedback controller 275 employs a preferred set of feedback gains 265 to determine first and second closed-loop torque corrections Ta_cl 237 and Tb_cl 247, respectively, for closed-loop control of torque commands of the torque generating devices in response to the control errors 271, which are primarily speed errors. The feedback controller 275 is described in detail with reference to FIG. 3. The constraints scheme 260 includes a first scheme 270 and a torque translator scheme 224 to determine final motor torque commands Ta 235' and Tb 245' and a final engine torque command Te 117 for controlling operation of the powertrain system 100, and to select the preferred set of feedback gains 265 employed by the feedback controller 275. In one embodiment there are first and second sets of feedback gains, with one of the first and second sets selected as the preferred set of feedback gains 265, as described herein.

Figure 3:
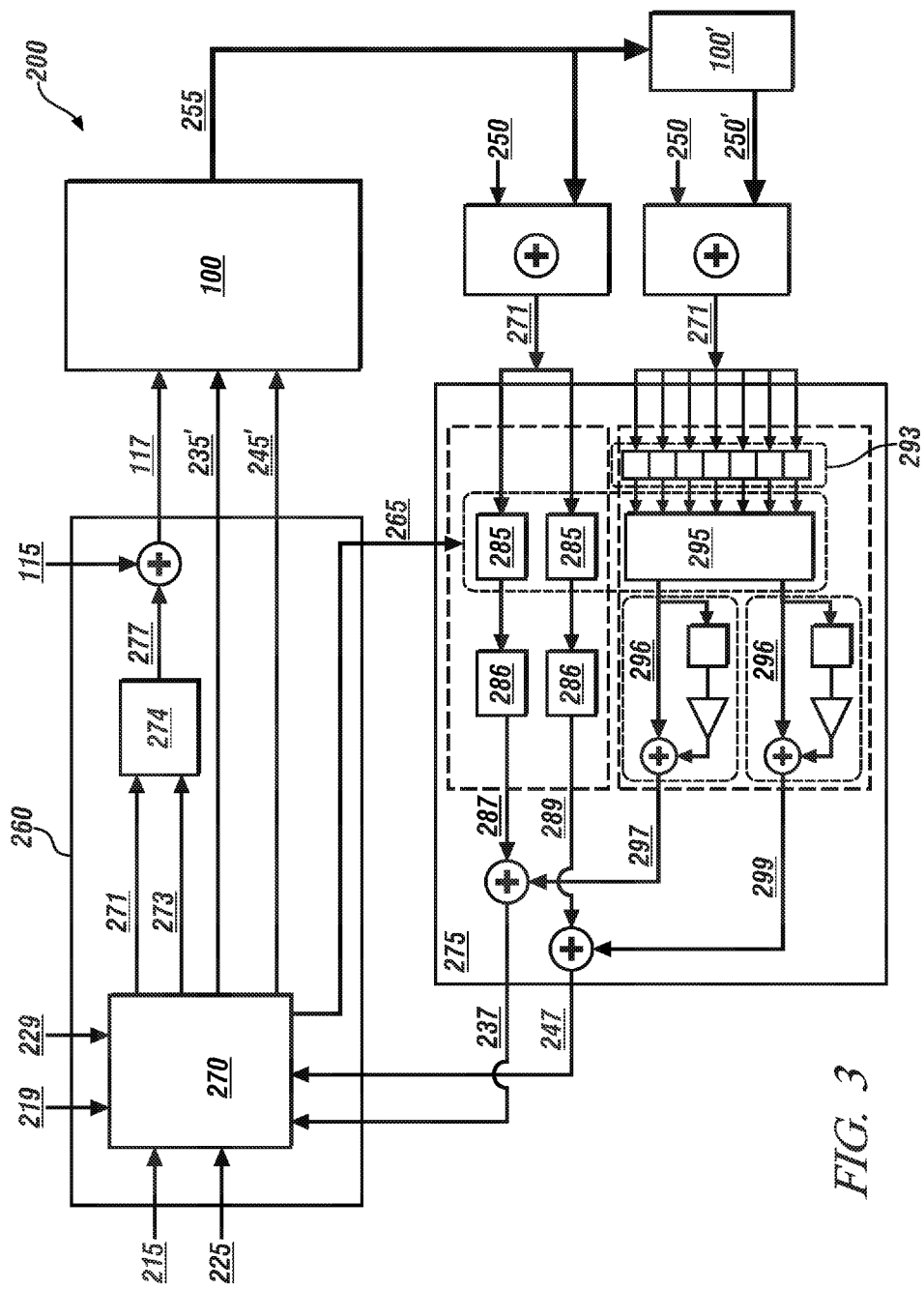

FIG. 3 schematically shows portions of the closed-loop speed control system 200, including details of the constraints scheme 260 and the feedback controller 275 to control operation of elements of the aforementioned powertrain system 100 in response to the output torque request. Inputs to the feedback controller 275 include the control errors 271 and the preferred set of feedback gains 265, with the preferred set of feedback gains 265 including integral gains and proportional gains. The feedback controller 275 includes an integral element 280 employing the integral gains, and an accumulated difference torque control element 290 employing the proportional gains.

The constraints scheme 260 includes the first scheme 270 and the torque translator scheme 224 to determine final motor torque commands Ta 235' and Tb 245' and the final engine torque command Te 117 for controlling operation of the powertrain system 100, and to select the preferred set of feedback gains 265 employed by the feedback controller 275. The final motor torque commands Ta 235' and Tb 245' and the final engine torque command Te 117 are determined and limited by the open-loop motor torque commands Ta_ol 215 and Tb_ol 225 and the open-loop engine torque command Te_ol 115, the first and second closed-loop torque corrections Ta_cl 237 and Tb_cl 247, and first and second motor torque constraints Ta_cnstr 219 and Tb_cnstr 229, respectively. The first and second motor torque constraints Ta_cnstr 219 and Tb_cnstr 229 are motor torque constraints that are based upon battery power limits and represent maximum achievable torque commands from the first and second torque machines in view of the battery power limits. The open-loop motor torque commands Ta_ol 215 and Tb_ol 225 and the engine torque command Te_ol 115 are input to the constraints scheme 260 to determine final motor torque commands Ta 235' and Tb 245' and a final engine torque command Te 117 for controlling operation of the powertrain system 100. Other constraints include motor torque limits, i.e., torque limits equal to minimum and maximum motor torques that are achievable for a given speed when operating at maximum current, the torque limits of torque transmitting elements, e.g., clutch torque limits, belt limits if a belted torque device is employed, chain limits if a chain is employed, and other torque limitations.

The integral element 280 employs the integral gains of the preferred set of feedback gains 265 and selected ones of the control errors 271 to determine first and second integral torque corrections Ta_int 287 and Tb_int 289, respectively. The selected ones of the control errors 271 include actual motor speed errors $Na_{err}$ and $Nb_{err}$, which are associated with respective differences between actual speeds of the first and second torque machines and corresponding reference speeds of the first and second torque machines. The actual motor speed errors $Na_{err}$ and $Nb_{err}$ are input to the integral element 280, which employs gain functions 285 coupled with corresponding integrating functions 286 to determine first and second integral torque corrections Ta_int 287 and Tb_int 289, respectively. The gain functions 285 coupled with corresponding integrating functions 286 may be represented mathematically as follows:

$$Ta\_int = I_{h1}\int_0^k Na_{err} + I_{h2}\int_0^k Nb_{err} \qquad [1]$$

$$Tb\_int = I_{h3}\int_0^k Na_{err} + I_{h4}\int_0^k Nb_{err} \qquad [2]$$

wherein
$I_{h1}$-$I_{h4}$ represent the integral gains of the preferred set of feedback gains 265, and
k represents the interval for integration.

The accumulated difference torque control element 290 employs selected ones of the control errors 271 and the proportional gains of the preferred set of feedback gains 265 to determine first and second proportional torque corrections 297 and 299, respectively. The selected ones of the control errors 271 include a plurality of estimated state errors, including estimated speed errors $\hat{Na}_{err}$ and $\hat{Nb}_{err}$ associated with the first and second torque machines, estimated engine speed error $\hat{Ne}_{err}$, estimated input speed error $\hat{Ni}_{err}$, estimated output speed error $\hat{No}_{err}$, and a plurality of estimated torque errors, including those associated with damper torque $\hat{Tdmpr}_{err}$ and axle torque $\hat{Tax}_{err}$. Each of the estimated state errors is associated with a difference between actual states and corresponding estimated states. The estimated state errors are each input to a difference function 293 to determine time-based changes in the estimated state errors. The time-based changes in the estimated state errors are subject to a proportional function 295 and accumulator functions 296 to determine first and second proportional torque corrections 297 and 299, respectively.

The proportional function 295 employs the time-based changes in the estimated state errors and the proportional gains of the preferred set of feedback gains 265 to determine respective initial proportional torque commands $T_a(k)$ and $T_a(k)$, which may be calculated as follows:

$$T_a(k) = A_1 \cdot \hat{Ne}_{err} + B_1 \cdot \hat{Na}_{err} + C_1 \cdot \hat{Nb}_{err} + D_1 \cdot \hat{No}_{err} + E_1 \cdot \hat{Tdmpr}_{err} + F_1 \cdot \hat{Tax}_{err} \qquad [3]$$

$$T_b(k) = A_2 \cdot \hat{Ne}_{err} + B_2 \cdot \hat{Na}_{err} + C_2 \cdot \hat{Nb}_{err} + D_2 \cdot \hat{No}_{err} + E_2 \cdot \hat{Tdmpr}_{err} + F_2 \cdot \hat{Tax}_{err} \qquad [4]$$

wherein $[A_1 \ldots F_1]$ and $[A_2 \ldots F_2]$ represent the proportional gains of the preferred set of feedback gains 265.

The initial proportional torque commands $T_a(k)$ and $T_a(k)$ are input to corresponding accumulator functions 296 to determine first and second proportional torque corrections Ta_prop 297 and Tb_prop 299. The first and second proportional torque corrections Ta_prop 297 and Tb_prop 299 are arithmetically combined with the first and second integral torque corrections Ta_int 287 and Tb_int 289 to determine the first and second closed-loop torque corrections Ta_cl 237 and Tb_cl 247.

When operation of the powertrain system 100 is within the battery power limits, the control system controls the torque commands of the first and second torque machines to achieve input speed control employing proportional gains of the first set of feedback gains, which is selected as the preferred set of feedback gains 265. However, when operation of the powertrain system 100 causes the battery power limits to be approached or achieved, the control system controls the torque command of the engine to achieve input speed control, and controls the torque commands of the first and second torque machines employing the proportional gains of the second set of feedback gains, which is selected as the preferred set of feedback gains 265. The battery power limits are said to be approached when the battery power is within a predetermined range of the battery power limits, e.g., at 95% of the battery power limits in one embodiment.

An integrated derivative control law is employed to accommodate the changes in proportional gains corresponding to changes in the preferred set of feedback gains 265 from the first set of feedback gains to the second set of feedback gains when the battery power limits are approached or achieved. The proportional gains are employed in the proportional function 295 when converting from controlling the first and second torque machines 62, 64 to controlling the engine 12.

The integrated derivative control law is as follows:

$$T\_prop = \left( \sum \left( StateError\_n * \left[ \frac{z-1}{z} \right] \right) * K_{prop} \right) * \left[ \frac{z}{z-a} \right] \qquad [5]$$

wherein
T_prop is one of the first and second proportional torque corrections Ta_prop 297 and Tb_prop 299,
$K_{prop}$ represents the proportional gains of the preferred set of feedback gains 265,
StateError_n represents selected ones of the control errors 271 including the estimated state errors, $$\left[ \frac{z-1}{z} \right]$$

is a difference function, and $$\left[ \frac{z}{z-a} \right]$$

is a DC blocking accumulator.

As shown, execution of Eq. 5 includes taking a difference of each state error and then applying the proportional gain vector $K_{prop}$ to determine a difference torque. The difference torque is converted to the proportional torque, i.e., one of the first and second proportional torque corrections Ta_prop 297 and Tb_prop 299, by multiplying by an accumulator that has been configured to leak the accumulated torque which performs the function of the DC blocking filter of the accumulator functions 296. The DC blocking filter of each of the accumulator functions 296 preferably has a cutoff frequency that acts as a built-in high-pass filter for the accumulator.

The preferred set of feedback gains 265 including the integral gains and the proportional gains is selected as one of the first and second sets of feedback gains 265 depending upon whether one of the open-loop motor torque commands combined with one of the corresponding the first and second torque errors, i.e., one of the total torque commands, exceeds the corresponding one of the motor torque constraints. When the total torque does not exceed the associated motor torque constraint, the first set of feedback gains is selected as the preferred set of feedback gains 265. When the total torque exceeds the motor torque constraint, the second set of feedback gains is selected as the preferred set of feedback gains 265. The first set of feedback gains is greater than the second set of feedback gains. The magnitudes of the terms in the preferred set of feedback gains 265 are reduced when the total torque exceeds the motor torque constraint to accommodate response times of the engine 12 that affect torque output of the engine 12. The response times of the engine 12 include time lag(s) between a commanded change in the engine torque and an actual change in the engine torque caused by such elements as air flow and intake manifold fill times, fuel injection adjustments, spark timing adjustments, EGR adjustments, and other engine control adjustments. The magnitudes of the terms in the first and second sets of feedback gains are preferably precalibrated values that are developed for specific embodiments of the powertrain system 100.

The constraints scheme 260 includes a first scheme 270 that evaluates and manipulates the various torque commands and constraints to determine final torque commands and to determine the preferred set of feedback gains 265 for the feedback controller 275. The various torque commands and constraints include the open-loop motor torque commands Ta_ol 215 and Tb_ol 225, the first and second closed-loop torque corrections Ta_cl 237 and Tb_cl 247, the first and second motor torque constraints Ta_cnstr 219 and Tb_cnstr 229, and the open-loop engine torque command Te_ol 115.

The open-loop motor torque commands Ta_ol 215 and Tb_ol 225 are added to the corresponding first and second closed-loop torque corrections Ta_cl 237 and Tb_cl 247 to determine total torque commands Ta_total and Tb_total, respectively. The final motor torque commands Ta_final 235' and Tb_final 245' are determined as minimum values of the first and second motor torque constraints Ta_cnstr 219 and Tb_cnstr 229 and the corresponding total torque commands Ta_total and Tb_total, as follows.

$$Ta\_final = MIN[Ta\_total, Ta\_cnstr] \quad [6]$$

$$Tb\_final = MIN[Tb\_total, Tb\_cnstr] \quad [7]$$

Differences between the total torque commands Ta_total and Tb_total, and corresponding first and second motor torque constraints Ta_cnstr 219 and Tb_cnstr 229 are calculated as follows.

$$\Delta Ta = Ta\_total - Ta\_cnstr \quad [8]$$

$$\Delta Tb = Tb\_total - Tb\_cnstr \quad [9]$$

The torque differences ΔTa 221 and ΔTb 223 are input to the torque translator scheme 224 for conversion to a closed-loop engine torque command Te_cl 227 that is responsive to the closed-loop speed control system 200. The closed-loop engine torque command Te_cl 227 is arithmetically combined with the open-loop engine torque command Te_ol 115 to determine the final engine torque command Te 117, which is employed to control operation of the engine 12, as follows.

$$Te = Te\_cl + Te\_ol \quad [10]$$

This is an iterative process, with the closed-loop speed control system 200 and all the associated elements and control schemes executed during one of the aforementioned loop cycles to determine the final engine torque command Te 117 for controlling the engine 12 in response to motor torque constraints including maximum achievable torque commands from the first and second torque machines 62, 64 in view of the battery power limits, and to determine the final motor torque commands Ta_final 235' and Tb_final 245' for controlling the first and second torque machines 62, 64. It is appreciated that the concepts described herein apply to the powertrain system 100 employing the closed-loop speed control system 200 described herein, and also to other powertrain systems that can advantageously employ an embodiment of the closed-loop speed control system 200.

Figure 4:
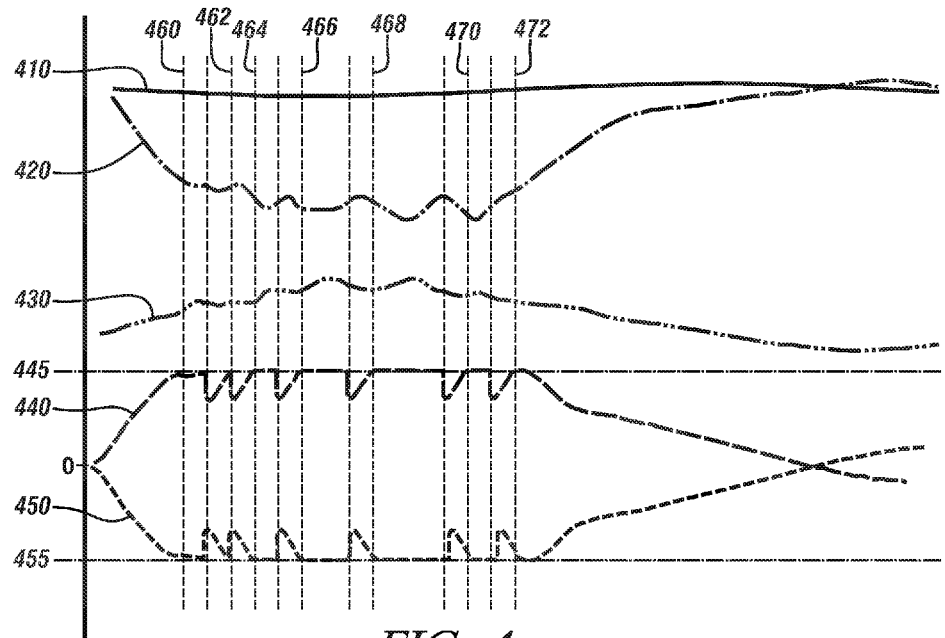
FIG. 4 illustrates a plurality of torque and speed parameters associated with operating the powertrain system of FIG. 1 not employing the closed-loop control system of FIGS. 2 and 3, in accordance with the disclosure.

FIG. 4 graphically shows a plurality of torque and speed parameters associated with operating an embodiment of the powertrain system 10 described with reference to FIG. 1, employing a closed-loop control system having a simple gain switching control scheme to control torque command of the engine and the first and second torque machines upon achieving the first and second motor torque constraints. Depicted data includes an input speed profile 410, and actual engine speed 420, engine torque 430, and first and second motor torque commands 440 and 450 associated with respective torque commands for the first and second torque machines, all of which are shown coincidentally in relation to elapsed time.

The input speed profile 410 is an estimate of upcoming input speed that is determined based upon present engine operating conditions, and preferably describes desired input speed for forthcoming cycles. First and second motor torque constraints 445 and 455, respectively are shown, and represent maximum achievable torque commands from the first and second torque machines in view of battery power limits. As shown, the first and second motor torque commands 440 and 450 reach the respective one of the first and second motor torque constraints 445 and 455 at each of time points 460, 462, 464, 466, 468, 470 and 472. The closed-loop control system having the simple gain switching control scheme controls torque command of the engine in response, and the actual engine speed 420 and the engine torque 430 are shown to fluctuate, with such fluctuations being discernible by a vehicle operator.

Figure 5:
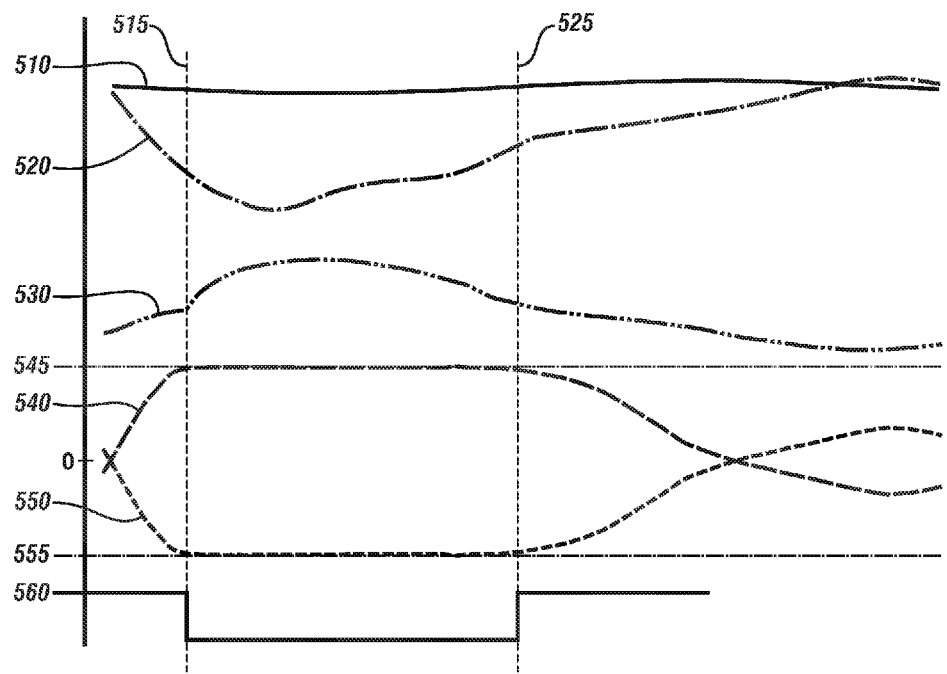
FIG. 5 illustrates a plurality of torque and speed parameters associated with operating the powertrain system of FIG. 1, employing the closed-loop control system of FIGS. 2 and 3, in accordance with the disclosure.

FIG. 5 graphically shows a plurality of torque and speed parameters associated with operating an embodiment of the powertrain system 10 described with reference to FIG. 1, employing the closed-loop speed control system 200 described with reference to FIGS. 2 and 3 to control torque command of the engine and the first and second torque machines upon achieving the first and second motor torque constraints. Depicted data includes an input speed profile 510, and actual engine speed 520, engine torque 530, first and second motor torque commands 540 and 550 associated with respective torque commands for the first and second torque machines, and proportional gains 560. The proportional gains 560 correspond to the proportional gains of the preferred set of feedback gains 265 that are described with reference to FIGS. 2 and 3. The depicted data are shown coincidentally in relation to elapsed time. First and second motor torque constraints 545 and 555, respectively, are shown and represent maximum achievable torque commands from the first and second torque machines in view of battery power limits. As shown, at time point 515 the first and second motor torque commands 540 and 550 reach the respective one of the first and second motor torque constraints 545 and 555. The magnitude of the proportional gains 560 reduces in response, and the closed-loop speed control system 200 described with reference to FIGS. 2 and 3 including the accumulated difference torque control element 290 are employed to control torque command of the engine in response. The first and second motor torque commands 540 and 550 remain at the limits imposed by the first and second motor torque constraints 445 and 455, and the engine torque 530 is shown to change in a reasonably stable manner. At time point 525, the first and second motor torque commands 540 and 550 retreat from the respective one of the first and second motor torque constraints 545 and 555, and the magnitude of the proportional gains 560 increases in response. Subsequently, the input speed 520 increases in response to the input speed profile 510.

The operation of the closed-loop speed control system 200, including details of the constraints scheme 260 and the feedback controller 275 to control operation of elements of the aforementioned powertrain system 10 in response to the output torque request acts to prevent engine oscillation at the battery power limits by translating the torque command to the engine 12 while accommodating an increase in lag associated with torque actuator response time in switching from using the first and second torque machines 62, 64 as the primary torque controllers to using the engine 12 as the primary torque controller while employing the closed-loop speed control system 200 to control operation of the powertrain system 10.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling a powertrain including an engine and torque machines configured to transfer torque through a multi-mode transmission to an output member, comprising:
employing a closed-loop speed control system to control torque commands for the torque machines in response to a desired input speed;
from an immediately preceding iteration of the closed-loop speed control system:
monitoring open-loop motor torque commands, power limited torque commands for the torque machines and closed-loop torque corrections for the torque commands for the torque machines,
combining the open-loop motor torque commands and the closed-loop torque corrections,
comparing the combined open-loop motor torque commands and the closed-loop torque corrections to the power limited torque commands, and
selecting a preferred set of feedback gains to be employed during a present iteration of the closed-loop speed control system based on the comparing; and
upon approaching a power limit of a power storage device transferring power to the torque machines during the present iteration of the closed-loop speed control system, determining power limited torque commands for the torque machines in response to said power limit and employing the closed-loop speed control system to determine an engine torque command in response to the desired input speed and the power limited torque commands for the torque machines, comprising:
determining closed-loop torque corrections for the torque commands for the torque machines during the present iteration based on the preferred set of feedback gains selected from the immediately preceding iteration, the selected preferred set of feedback gains comprising precalibrated values to account for time lags between an actual change in engine torque and changes in the engine torque command, and further based on control errors,
the determined closed-loop torque corrections including proportional torque corrections and integral torque corrections;
combining the closed-loop torque corrections determined during the present iteration with open-loop motor torque commands for the present iteration,
determining differences between the combined closed-loop torque corrections and open-loop motor torque commands and said power limited torque commands for the torque machines, and
determining the engine torque command in response to said differences.

2. The method of claim 1, wherein determining the engine torque command in response to said differences comprises:
determining a closed-loop engine torque command in response to said differences; and
combining the closed-loop engine torque command and an open-loop torque command to determine a final engine torque command.

3. The method of claim 1, wherein determining closed-loop torque corrections for the torque commands for the torque machines during the present iteration comprises:
employing first control errors and proportional gains of the preferred set of feedback gains to determine proportional torque corrections;
employing second control errors and integral gains of the preferred set of feedback gains to determine integral torque corrections; and
combining the integral torque corrections and the proportional torque corrections to determine the closed-loop torque corrections.

4. The method of claim 3, wherein the preferred set of feedback gains comprises one of a first and second set of feedback gains, wherein
the first set of feedback gains is selected as the preferred set of feedback gains when the combined closed-loop torque corrections and open-loop motor torque commands fail to exceed the power limited torque commands for the torque machines;
the second set of feedback gains is selected as the preferred set of feedback gains when the combined closed-loop torque corrections and open-loop motor torque commands exceeds the power limited torque commands for the torque machines; and
the first set of feedback gains is greater than the second set of feedback gains.

5. The method of claim 3, wherein employing first control errors and proportional gains of the preferred set of feedback gains to determine proportional torque corrections comprises employing an integrated derivative control law in accordance with the following relationship:

$$\text{T\_prop} = \left( \sum \left( \text{StateError\_n} * \left[ \frac{z-1}{z} \right] \right) * K_{prop} \right) * \left[ \frac{z}{z-a} \right]$$

wherein
T_prop is one of first and second proportional torque corrections Ta_prop and Tb_prop,
$K_{prop}$ represents a proportional gains of the preferred set of feedback gains,
StateError_n represents selected ones of control errors including estimated state errors, $$\left[ \frac{z-1}{z} \right]$$

is a difference function, and $$\left[ \frac{z}{z-a} \right]$$

is a DC blocking accumulator.

6. The method of claim 3, wherein employing second control errors and integral gains of the preferred set of feedback gains to determine integral torque corrections comprises determining the integral torque corrections in accordance with the following relationships:

$$Ta\_int = I_{h1} \int_0^k Na_{err} + I_{h2} \int_0^k Nb_{err}, \text{ and}$$

$$Tb\_int = I_{h3}\int_0^k Na_{err} + I_{h4}\int_0^k Nb_{err}$$

wherein
Ta_int and Tb_int are integral torque corrections,
$I_{h1}$-$I_{h4}$ represent integral gains of the preferred set of feedback gains, and
$Na_{err}$ and $Nb_{err}$ are the second control errors comprising actual motor speed errors.

7. The method of claim 6, wherein the actual motor speed errors comprise differences between actual speeds of the torque machines and corresponding reference speeds of the torque machines.

8. Method for controlling a powertrain system, comprising:
from an immediately preceding iteration of a closed-loop speed control system:
monitoring open-loop motor torque commands, power limited torque commands for the torque machines and closed-loop torque corrections for the torque commands for the torque machines;
combining the open-loop motor torque commands and the closed-loop torque corrections;
comparing the combined open-loop motor torque commands and the closed-loop torque corrections to the power limited torque commands; and
selecting a preferred set of feedback gains to be employed during a present iteration of the closed-loop speed control system based on the comparing;
upon achieving a battery power limit of a battery configured to supply power to a plurality of torque machines configured to transfer torque to a multi-mode transmission, controlling battery power limited torque commands for the torque machines in response to the battery power limit and employing a closed-loop speed control system to control an input torque command for an internal combustion engine coupled to the multi-mode transmission, wherein employing the closed-loop speed control system to control the input torque command for the internal combustion engine comprises:
determining closed-loop torque corrections for the torque commands for the torque machines during the present iteration based on the preferred set of feedback gains selected from the immediately preceding iteration, the selected preferred set of feedback gains comprising precalibrated values to account for time lags between an actual change in input torque and changes in the input torque command, and further based on control errors,
the determined closed-loop torque corrections including proportional torque corrections and integral torque corrections;
combining the closed-loop torque corrections determined during the present iteration with open-loop motor torque commands for the present iteration;
determining differences between the combined closed-loop torque corrections and open-loop motor torque commands and said battery power limited torque commands for the torque machines; and
determining the engine torque command in response to said differences.

9. The method of claim 8, wherein determining the input torque command in response to said differences comprises:
determining a closed-loop input torque command in response to said differences; and
combining the closed-loop input torque command and an open-loop input torque command to determine a final engine torque command.

10. The method of claim 8, wherein determining closed-loop torque corrections for the torque commands for the torque machines during the present iteration comprises:
employing first control errors and proportional gains of the preferred set of feedback gains to determine proportional torque corrections;
employing second control errors and integral gains of the preferred set of feedback gains to determine integral torque corrections; and
combining the integral torque corrections and the proportional torque corrections to determine the closed-loop torque corrections.

11. The method of claim 10, wherein the preferred set of feedback gains comprises one of a first and second set of feedback gains, wherein
the first set of feedback gains is selected as the preferred set of feedback gains when the combined closed-loop torque corrections and open-loop motor torque commands fail to exceed the battery power limited torque commands for the torque machines;
the second set of feedback gains is selected as the preferred set of feedback gains when the combined closed-loop torque corrections and open-loop motor torque commands exceeds the battery power limited torque commands for the torque machines; and
the first set of feedback gains is greater than the second set of feedback gains.

12. The method of claim 10, wherein employing first control errors and proportional gains of the preferred set of feedback gains to determine proportional torque corrections comprises employing an integrated derivative control law in accordance with the following relationship:

$$T\_prop = \left(\sum\left(StateError\_n * \left[\frac{z-1}{z}\right]\right) * K_{prop}\right) * \left[\frac{z}{z-a}\right]$$

wherein
T_prop is one of first and second proportional torque corrections Ta_prop and Tb_prop,
$K_{prop}$ represents a proportional gains of the preferred set of feedback gains,
StateError_n represents selected ones of control errors including estimated state errors, $$\left[\frac{z-1}{z}\right]$$

is a difference function, and $$\left[\frac{z}{z-a}\right]$$

is a DC blocking accumulator.

13. The method of claim 8, wherein employing second control errors and integral gains of the preferred set of feedback gains to determine integral torque corrections comprises determining the integral torque corrections in accordance with the following relationships:

$$Ta\_int = I_{h1}\int_0^k Na_{err} + I_{h2}\int_0^k Nb_{err}, \text{ and}$$

$$Tb\_int = I_{h3}\int_0^k Na_{err} + I_{h4}\int_0^k Nb_{err}$$

wherein

Ta_int and Tb_int are integral torque corrections,
$I_{h1}$-$I_{h4}$ represent integral gains of the preferred set of feedback gains, and
$Na_{err}$ and $Nb_{err}$ are the second control errors comprising actual motor speed errors.

14. The method of claim 13, wherein the actual motor speed errors comprise differences between actual speeds of the torque machines and corresponding reference speeds of the torque machines.

\* \* \* \* \*